US012616210B2

(12) United States Patent
Zhang et al.

(10) Patent No.: US 12,616,210 B2
(45) Date of Patent: May 5, 2026

(54) FOOD FORMING METHOD AND FORMING MECHANISM

(71) Applicant: Tongqi Zhang, Tianjin (CN)

(72) Inventors: Tongqi Zhang, Tianjin (CN); Baoqing Zhao, Tianjin (CN)

(73) Assignee: Tongqi Zhang, Tianjin (CN)

( * ) Notice: Subject to any disclaimer, the term of this patent is extended or adjusted under 35 U.S.C. 154(b) by 957 days.

(21) Appl. No.: 17/865,645

(22) Filed: Jul. 15, 2022

(65) Prior Publication Data

US 2022/0346386 A1 Nov. 3, 2022

Related U.S. Application Data

(63) Continuation of application No. PCT/CN2021/071771, filed on Jan. 14, 2021.

(30) Foreign Application Priority Data

Jan. 15, 2020 (CN) .......................... 202010043983.2

(51) Int. Cl.
*A21C 9/06* (2006.01)
*A23P 20/20* (2016.01)

(52) U.S. Cl.
CPC .............. *A21C 9/063* (2013.01); *A23P 20/20* (2016.08)

(58) Field of Classification Search
CPC ........ A21C 9/063; A23P 20/20; A23G 3/0019
(Continued)

(56) References Cited

U.S. PATENT DOCUMENTS 3,669,007 A 6/1972 Pulici
3,912,433 A * 10/1975 Ma .......................... A23P 20/20
99/450.6
(Continued)

FOREIGN PATENT DOCUMENTS

CN 102550615 A 7/2012
CN 102550615 B 10/2014
(Continued)

OTHER PUBLICATIONS

CN207054635U machine translation (Year: 2018).*
(Continued)

*Primary Examiner* — Steven W Crabb
*Assistant Examiner* — Yeong Juen Thong
(74) *Attorney, Agent, or Firm* — Westbridge IP LLC

(57) ABSTRACT

Disclosed is a food forming mechanism comprising a supporting part for supporting a food blank on a forming station; two turning parts oppositely arranged and configured to fold two sides of the food blank respectively, at least one of the turning parts cooperating with the supporting part to form a clamping mechanism for clamping the food blank; a turning driving device for driving the turning part to turn; a rotation driving mechanism for driving the clamping mechanism to rotate to form the food blank into a rolled food; and a drawing driving mechanism configured at least to drive the clamping mechanism to be drawn out from the rolled food. Accordingly, the two sides of the food blank can be folded by mechanical automation equipment to form a rolled food by rotating a food blank, thereby effectively improving the food processing efficiency and enhancing the quality controllability.

18 Claims, 17 Drawing Sheets

(58) Field of Classification Search
USPC .................................. 99/450.6; 425/112, 502
See application file for complete search history.

(56) References Cited

U.S. PATENT DOCUMENTS

| | | | |
|---|---|---|---|
| 4,439,124 A * | 3/1984 | Watanabe .............. | A21C 9/063 |
| | | | 425/383 |
| 4,483,242 A | 11/1984 | Goodman et al. | |
| 7,487,718 B2 | 2/2009 | Foulon, Jr. et al. | |
| 2006/0144254 A1 | 7/2006 | Foulon et al. | |
| 2012/0308693 A1* | 12/2012 | Van Blokland .......... | A21C 3/06 |
| | | | 426/501 |
| 2019/0124969 A1* | 5/2019 | Shtilerman ............. | A23P 20/20 |

FOREIGN PATENT DOCUMENTS

| | | | | |
|---|---|---|---|---|
| CN | 204599244 U | | | 9/2015 |
| CN | 105638811 A | | | 6/2016 |
| CN | 106689246 A | | | 5/2017 |
| CN | 207054635 U | * | | 3/2018 |
| CN | 109362824 A | | | 2/2019 |
| CN | 209234790 U | | | 8/2019 |
| CN | 209300094 U | | | 8/2019 |
| CN | 111053271 A | | | 4/2020 |
| NL | 9201653 A | | | 4/1994 |
| NL | 9300975 A | | | 1/1995 |

OTHER PUBLICATIONS

First Office Action issued in counterpart Chinese Patent Application No. 202010043983.2, dated Apr. 22, 2021.
International Search Report issued in corresponding PCT Application No. PCT/CN2021/071771, dated Apr. 16, 2021.
Second Office Action issued in counterpart Chinese Patent Application No. 202010043983.2, dated Aug. 2, 2021.
Third Office Action issued in counterpart Chinese Patent Application No. 202010043983.2, dated Jan. 25, 2022.
European Search Report issued in counterpart European Patent Application No. EP 21741499.4, dated Jan. 4, 2024.

* cited by examiner

FOOD FORMING METHOD AND FORMING MECHANISM

CROSS-REFERENCE TO RELATED APPLICATIONS

This application is a continuation of International Application No. PCT/CN2021/071771, filed on Jan. 14, 2021, which claims priority to Chinese Patent Application No. 202010043983.2, filed on Jan. 15, 2020. The disclosures of the above-mentioned applications are incorporated herein by reference in their entireties.

TECHNICAL FIELD

The present invention relates to a food forming method and a forming mechanism, belonging to the field of food processing.

BACKGROUND

In the field of food processing, forming machines are often used for food processing. But for rolled foods such as spring rolls, because of their unique structure and shape, there is no automated forming equipment so far, and the rolls are still manually packed, which renders not only a low efficiency and relatively high personnel cost, but also a poor yield at times due to various specifications of the hand-rolled food.

SUMMARY OF THE INVENTION

Therefore, an object of the present invention is to provide a food forming method and a forming mechanism capable of automatically forming a rolled food.

In order to achieve the above object, a food forming method of the present invention comprises:

placing a food blank containing a wrapping skin on a supporting part;

folding two sides of the food blank by two oppositely arranged turning parts, the food blank being clamped by a clamping mechanism formed by at least one of the turning parts and the supporting part;

driving the clamping mechanism to rotate to form the food blank into a rolled food; and driving the clamping mechanism to move in a direction away from the rolled food so that the clamping mechanism is drawn out from the rolled food.

The present invention also provides a food forming mechanism, comprising:

a supporting part configured to support a food blank on a forming station;

two turning parts, which are oppositely arranged and configured to fold two sides of the food blank, wherein at least one of the turning parts cooperates with the supporting part to form clamping mechanism for clamping the food blank;

a turning driving device configured to drive the turning part to reverse;

a rotation driving mechanism configured to drive the clamping mechanism to rotate so as to form the food blank into a rolled food; and a drawing driving mechanism configured at least to drive the clamping mechanism to move in a direction away from the rolled food so that the clamping mechanism is drawn out from the rolled food.

By using the food forming method and the forming mechanism of the present invention, the food blank can be folded by mechanical automation equipment, and then be rotated to form the rolled food, which can effectively improve the food processing efficiency, reduce labor costs, and enhance the controllability of the processing quality.

DETAILED DESCRIPTION OF THE EMBODIMENTS

The present invention will be further described in detail below through the accompanying drawings and specific embodiments.

The food forming mechanism of the present invention is used for processing and forming a rolled food. For example, traditional spring rolls are a typical rolled food, consisting of bean paste filling covered with dough skin. First, the filling is placed on the sheet-shaped wrapping skin, one corner of the wrapping skin is folded to cover the filling, two adjacent opposite corners are folded in turn, and then rotationally shaping is performed. The wrapping skin can be dough skin, tofu skin, or other ingredients, and the filling can also be other type of materials or with different flavors.

Figure 1:
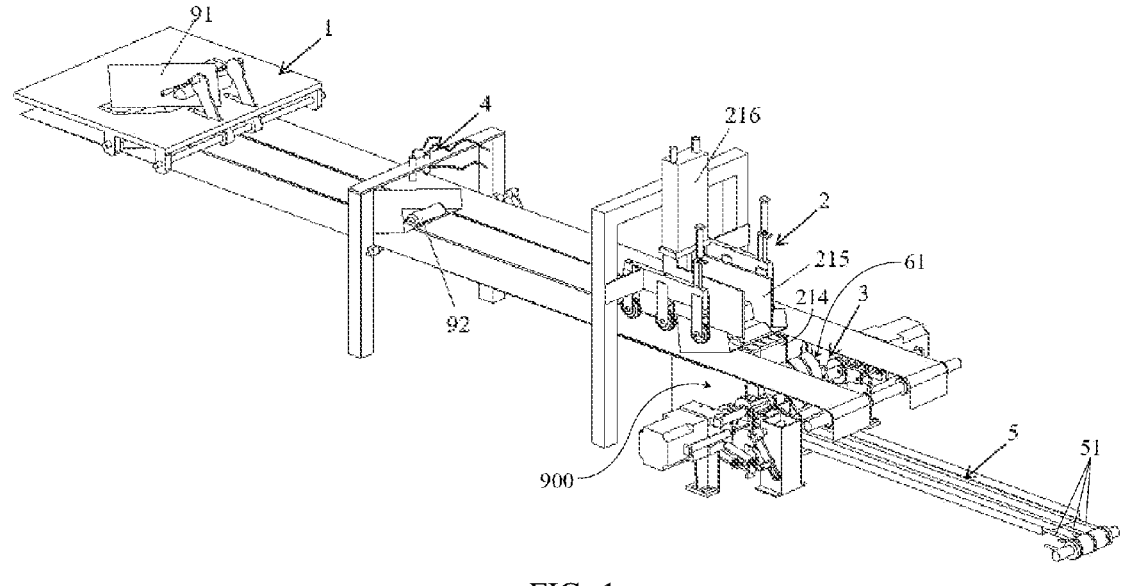
FIG. 1 is a schematic structural diagram of a food forming mechanism of the present invention.

In an embodiment of the present invention, as shown in FIG. 1, an apparatus for forming food includes a flanging mechanism 1, a first conveying device 2, a folding and rotating forming assembly 3, a glue spraying mechanism 4, and a second conveying device 5.

Before processing and forming, a sheet-like wrapping skin 901 is firstly laid flat, and filling 902 is placed on the wrapping skin 901, and the filling 902 is located near a corner of the wrapping skin 901 to form a primary blank 91.

Figure 2:
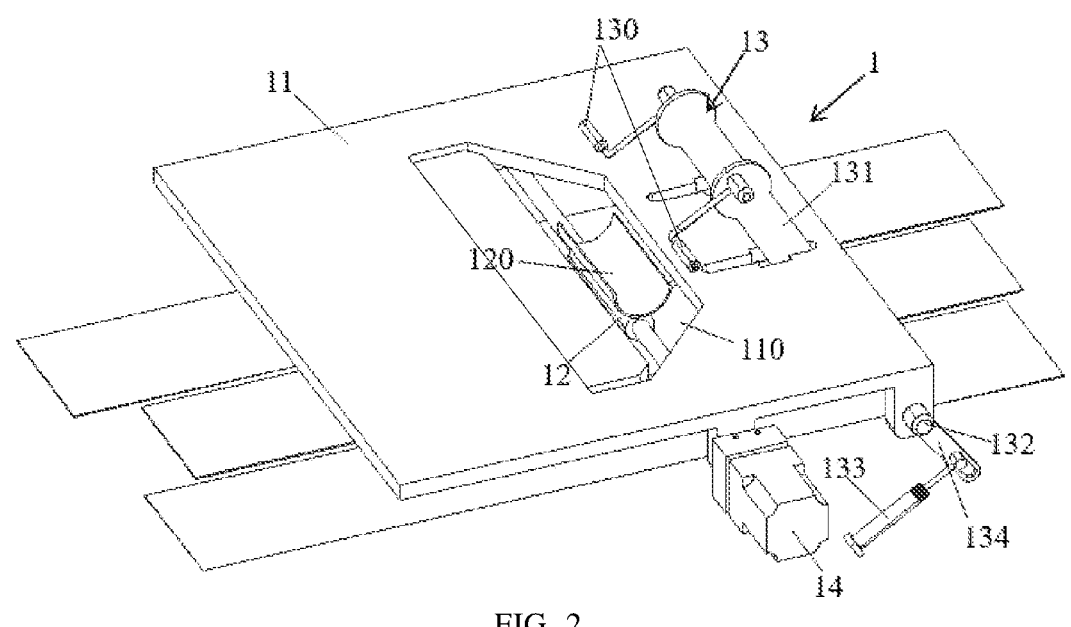
FIG. 2 is a schematic structural diagram of a flanging mechanism.

As shown in FIG. 2, the flanging mechanism 1 includes a platen 11 with a drain groove 110 and a reversible part 12 with an arc-shaped recess 120 located below the drain groove 110. The first conveying device 2 is located below the reversible part 12 and close to the reversible part 12. The flanging mechanism 1 further includes a compacting part 13 for compacting the wrapping skin 901 in the recess 120. The compacting part 13 includes two compacting rods 130 spaced apart from each other and used to press on two sides of the filling. The compacting rods 130 are arranged on a compacting rotating shaft 132 through a mounting plate 131. A swinging handle 134 connected to the compacting rotating shaft 132 can be driven to swing by a compacting cylinder 133, thereby driving the compacting rod 130 to be pressed down or lifted up. The compacting cylinder 133 can also drive the compacting rotating shaft 132 to rotate through a cam mechanism.

Figure 3:
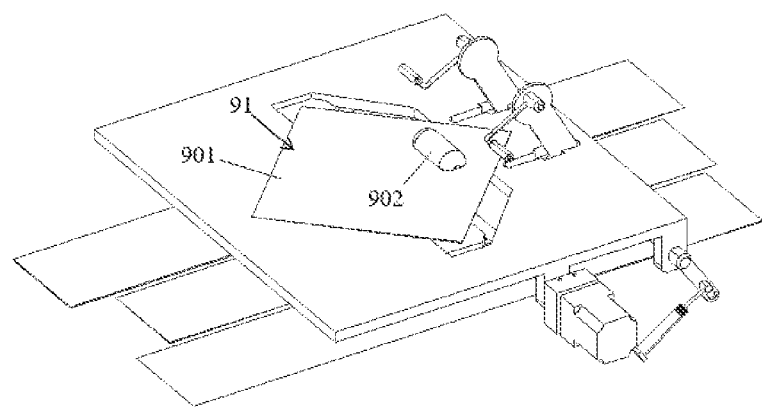
FIG. 3 is a partial schematic diagram of State 1 of the food forming process.
Figure 4:
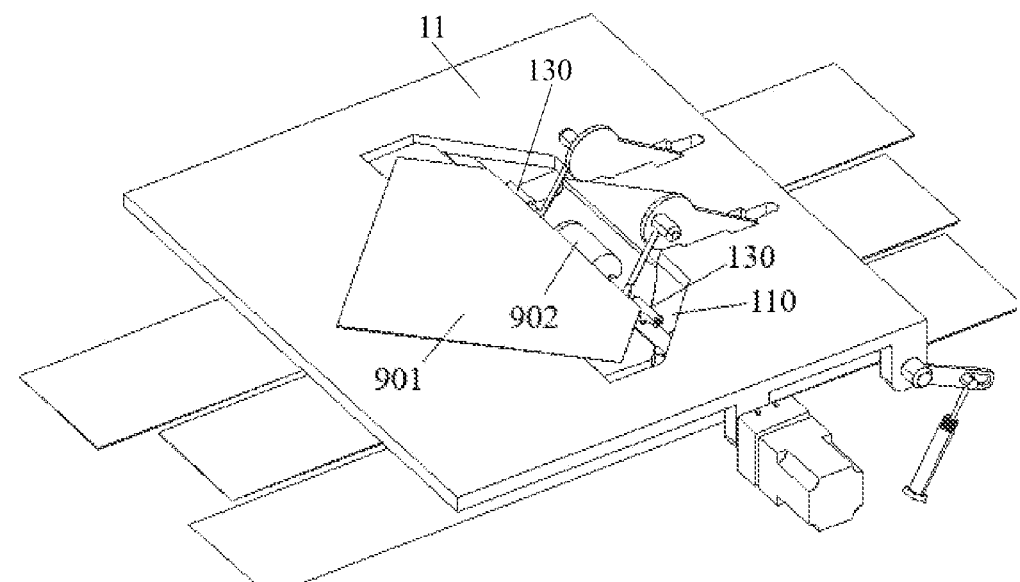
FIG. 4 is a partial schematic diagram of State 2 of the food forming process.
Figure 5:
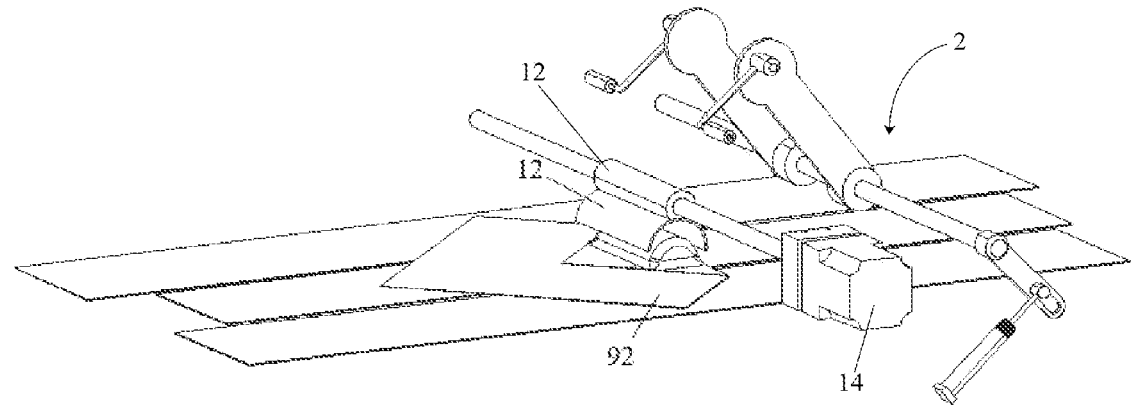
FIG. 5 is a partial schematic diagram of State 3 of the food forming process.

As shown in FIGS. 2 and 3, the primary blank 91 is placed on the platen 11 at first, and the drain groove 110 is located vertically below the filling 902. As shown in FIG. 4, the portion of the wrapping skin 901 that supports the filling 902 and the filling 902 can leak down from the drain groove 110 and enter the recess 120. The primary blank 91 may be compacted in the recess 120 by the compacting rod 130. As shown in FIG. 5, the reversible part 12 is installed on a power output end of a flanging motor 14, so that the reversible part 12 is driven to rotate by the flanging motor 14, and the wrapping skin 901 and the filling 902 are rolled under the reversible part 12 and land on the first conveying device 2. Then, a corner of the wrapping skin 901 close to the filling 902 is folded to cover the filling 902 so as to form a secondary blank 92.

The first conveying device 2 includes a conveying belt assembly and a lift-up forming mechanism 2112 for lifting up two sides of the secondary blank 92. The conveying belt assembly includes three conveying belts arranged adjacently in sequence. The middle part of the secondary blank 92 can be placed on the second conveying belt 202 in the middle, and the two sides of the secondary blank 92 are respectively located on the first conveying belt 201 and the third conveying belt 203 on two sides.

As show in FIG. 1, the glue spraying mechanism 4 is disposed above the first conveying device 2 and is used for spraying food glue on the passing secondary blank 92.

Figure 6:
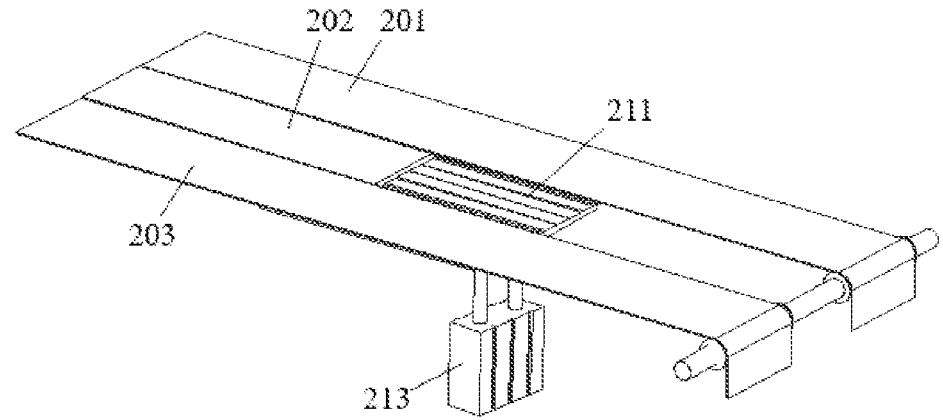
FIG. 6 is a partial schematic diagram of one embodiment of a first conveying device.
Figure 7:
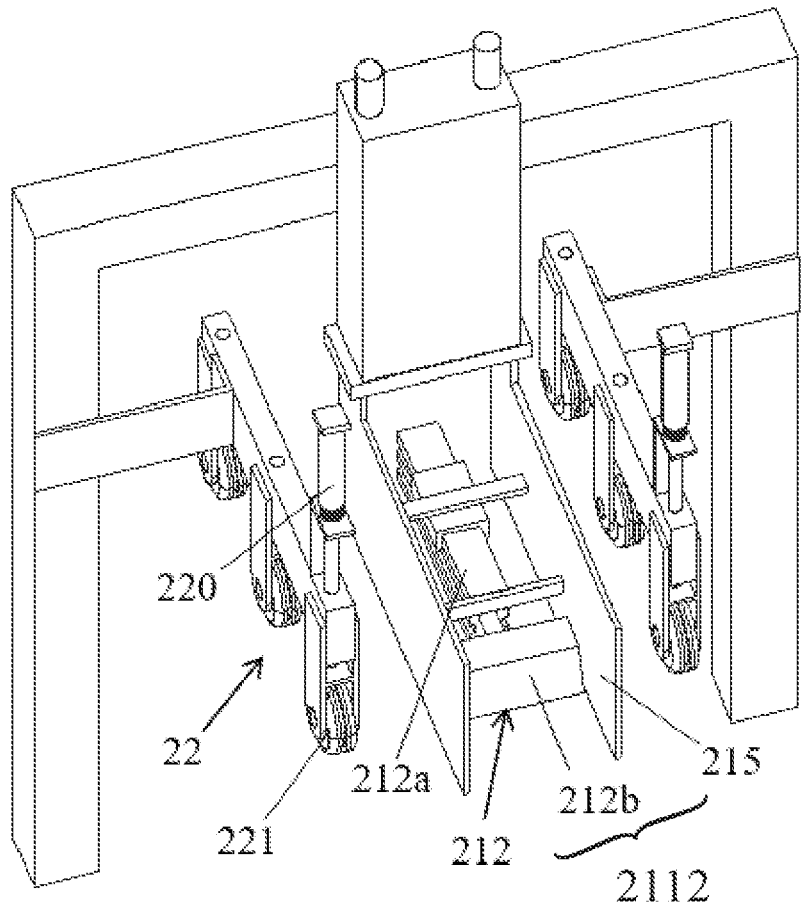
FIG. 7 is a schematic diagram of the installation structure of an auxiliary pressing roller assembly.

As shown in FIGS. 1, 6 and 7, the first conveying belt 201 and the third conveying belt 203 extend to a position beyond the second conveying belt 202. The lift-up forming mechanism 2112 includes a lifting plate 211 and a pushing device 212 disposed at the gap between the first conveying belt 201 and the third conveying belt 203. The lifting plate 211 can be driven by a lifting plate driving cylinder 213 to ascend to a position where one end of the lifting plate is close to the second conveying belt 202 and descend to a position where the other end of the lifting plate is close to the forming station 900. Fixed side plates 214 (also see FIG. 29) are provided on two sides of the lifting plate 211 and can block the two sides of the secondary blank 92 to keep them lifted up. The pushing device 212 is used for pushing the secondary blank 92 on the lifting plate 211 with the two sides lifted up to the forming station 900.

Figure 30:
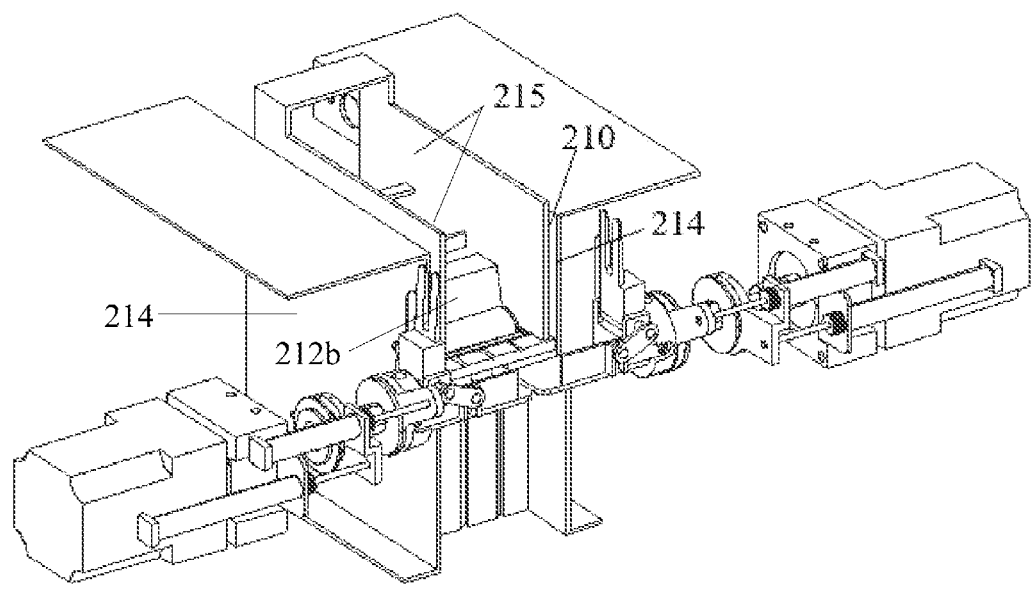
FIG. 30 is a partial schematic diagram of State 5 of the food forming process.

The lift-up forming mechanism 2112 further includes two movable side plates 215, which can be driven by a side plate driving cylinder 216 to form a gap 210 with the two fixed side plates 214 respectively, so as to respectively accommodate the two lifted sides of the secondary blank 92, as shown in FIG. 30.

As shown in FIG. 7, the pushing device 212 is installed between the two movable side plates 215, and includes a pushing cylinder 212a and a pushing block 212b.

An auxiliary pressing roller assembly 22 and a lifting driving device are respectively provided on two sides of the lifting plate 211 above the first conveying belt 201 and the third conveying belt 203. The lifting driving device is a lifting cylinder 220. The auxiliary pressing roll assembly 22 includes at least one pressing roll 221. The lifting cylinder 220 is used to drive the pressing roller 221 to lift upward.

Figure 29:
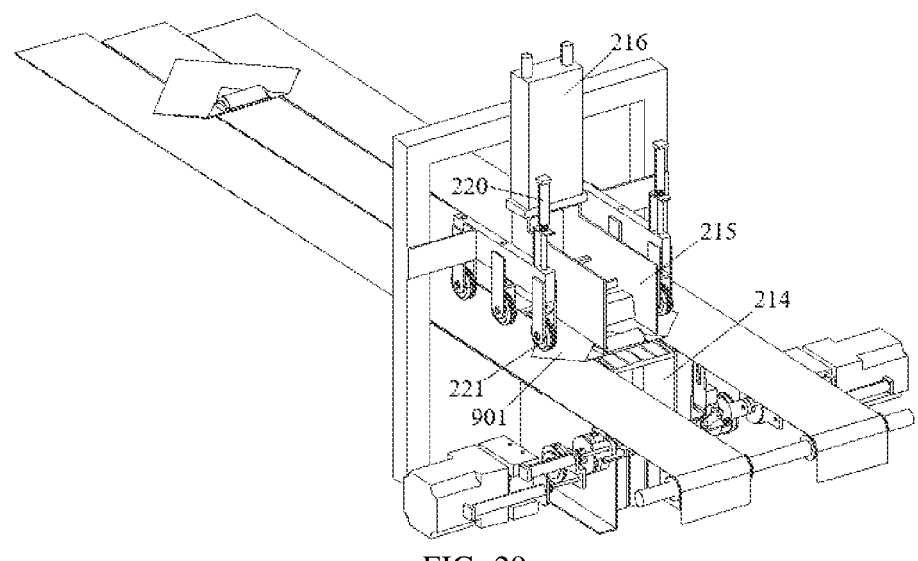
FIG. 29 is a partial schematic diagram of State 4 of the food forming process.

As shown in FIG. 29, since the lifting plate 211 does not have the conveying function of the conveying belt, the auxiliary pressing roller assembly 22 including at least one pressing roll 221 is used for pressing the two sides of the secondary blank 92 to increase the friction between the wrapping skin 901 and the first and third conveying belts 201 and 203, so that the secondary blank 92 is successfully sent to the lifting plate 211. Then, the lifting cylinder 220 is controlled to lift the pressing roller 221 upward, so that the two sides of the secondary blank 92 are not subjected to the pressing of the pressing roller 221, and then the lifting plate 211 is driven to descend by the lifting plate driving cylinder 213, and at the same time, the side plate driving cylinder 216 drives the movable side plates 215 and the pushing device 212 to descend, as shown in FIG. 30.

Figure 31:
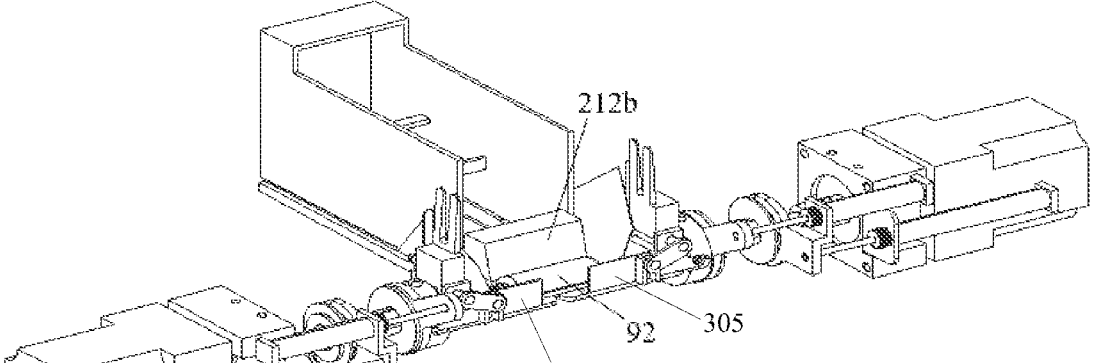
FIG. 31 is a partial schematic diagram of State 6 of the food forming process.

As shown in FIG. 31, the pushing block 212b is driven forward by the pushing cylinder 212a (shown in FIG. 7), so as to push the secondary blank 92 to the forming station 900.

Figure 41:
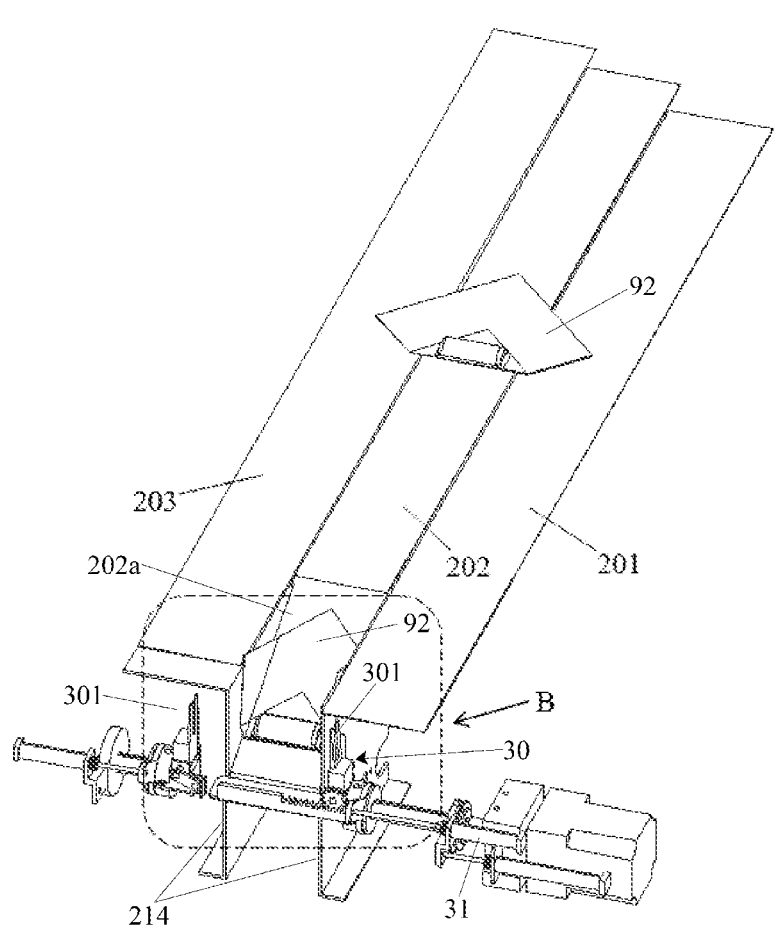
FIG. 41 is a schematic structural diagram of another embodiment of a lift-up forming mechanism.
Figure 42:
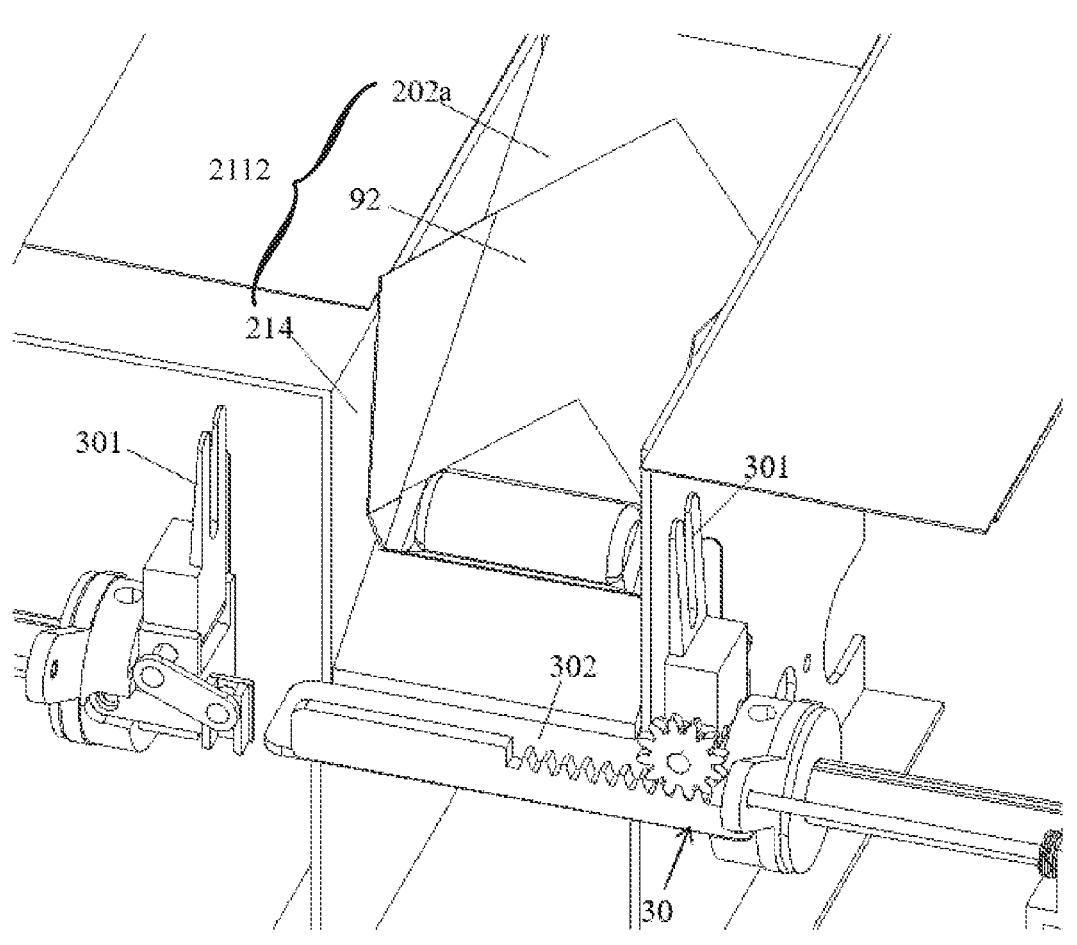
FIG. 42 is a partial enlarged diagram of part B in FIG. 41.

In another embodiment, as shown in FIGS. 41 and 42, the lift-up forming mechanism 2112 includes an inclined part 202a located at one end of the second conveying belt 202 close to the forming station 900 and fixed side plates 214 located on two sides of the inclined part 202a. The inclined part 202a is inclined downward so that its end extends to a position close to the forming station 900 and lower than the first conveying belt 201 and the third conveying belt 203. The fixed side plates 214 can turn back the two sides of the secondary blank 92 to keep them lifted up.

Figure 43:
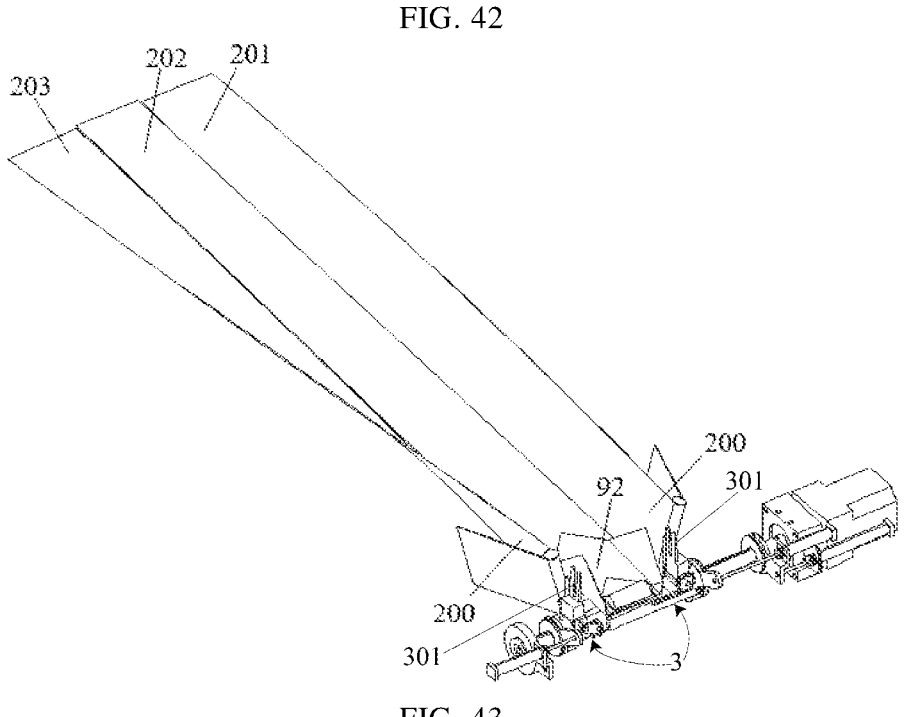
FIG. 43 is a schematic structural diagram of another embodiment of the lift-up forming mechanism.

In other embodiments, as shown in FIG. 43, the lift-up forming mechanism 2112 includes twisting parts 200 located respectively at one end of the first conveying belt 201 and the third conveying belt 203 close to the forming station 900. The side of the twisting part 200 away from the second conveying belt 202 is inclined upward. The end of the second conveying belt 202 extends close to the forming station 900.

Referring to FIG. 9 again, the forming station 900 is located on the folding and rotating forming assembly 3. The folding and rotating forming assembly 3 includes a supporting part 300, two oppositely arranged turning parts 301, a turning driving device 330 and a drawing driving mechanism 37. At least one turning part 301 and the supporting part 300 can cooperate with each other to form a clamping mechanism 30. The turning driving device 330 is used for driving the clamping mechanism 30 to reverse, and the drawing driving mechanism 37 is used for driving the clamping mechanism 30 to move forward or backward. The supporting part 300 is used for supporting the secondary blank 92 located on the forming station 900. The turning part 301 is used for turning over two sides of the secondary blank 92. The clamping mechanism 30 formed by the turning part 301 and the supporting part 300 can clamp the secondary blank 92.

Figure 8:
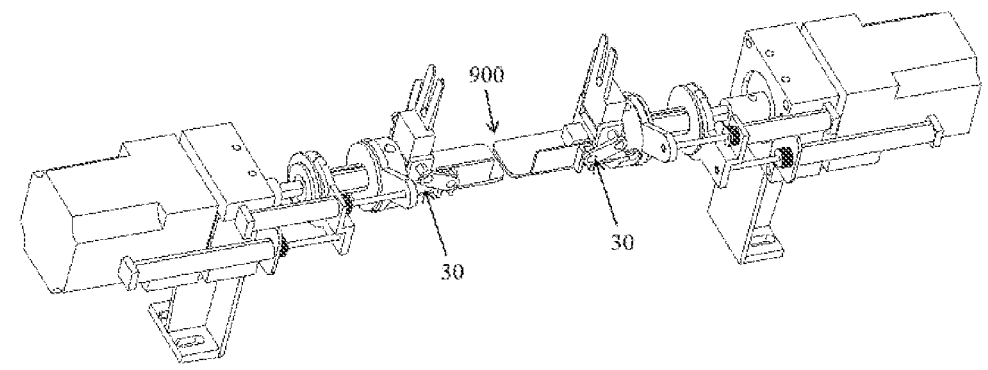
FIG. 8 is a schematic structural diagram of two clamping mechanisms arranged oppositely.
Figure 9:
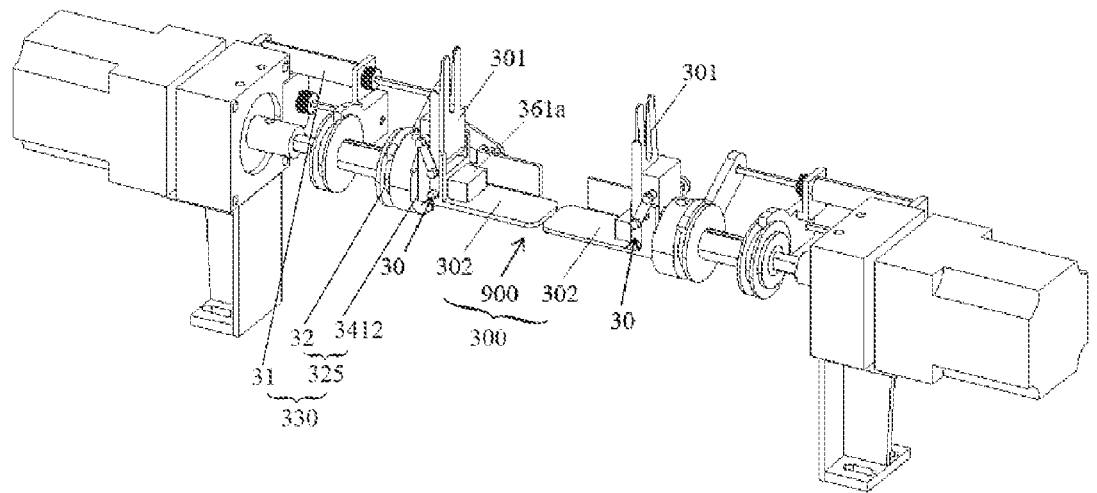
FIG. 9 is another perspective view of FIG. 8.

As shown in FIGS. 8 and 9, the supporting part 300 is composed of two supporting bodies 302 which are arranged oppositely and can be separated from each other, so that each supporting body 302 cooperates with one turning part 301 to form one clamping mechanism 30. In another embodiment, as shown in FIGS. 41 and 42, the folding and rotating forming assembly 3 includes only one clamping mechanism 30. The clamping mechanism 30 includes a support body 302 and a turning part 301. Another turning part 301 is arranged opposite to the clamping mechanism 30. The two turning parts 301 are respectively used to turn over the secondary blank 92 on both sides. The clamping mechanism 30 can be rotated, and the other turning part 301 can be rotated together, or the secondary blank 92 can be folded and then raised without participating in the rotation.

As shown in FIGS. 13-18, in this embodiment, the supporting body 302 in the clamping mechanism 30 is plate-shaped, the front end of the turning part 301 is a fork-shaped portion 301a, and the thickness of the fork-shaped portion 301a is gradually decreasing, so as to facilitate it pulling out from the inside of the rolled food after the food is rolled and formed. In other embodiments, the supporting body 302 may also be in a shape of a mesh, a lattice, or the like, and the turning part 301 may also be in a shape of a plate, a rod, or the like.

The supporting body 302 is integrally formed with a hinge seat 303. The turning part 301 is mounted on the hinge seat 303 through a reversing shaft 304. A side blocking part 305 is provided on one side of the supporting body 302. When the secondary blank 92 is sent to the supporting body 302, the side blocking part 305 can limit the secondary blank 92 to prevent the secondary blank 92 from being transported over the limit and falling from the supporting body 302. The side blocking part 305 can be fixed with the supporting body 302 as an integral structure, or can be separated from the supporting body 302 and can be separated from the side portion of the supporting body 302 when the turning part 301 and the supporting body 302 form the clamping mechanism 30, so that the side blocking part 305 will not be cladded by the wrapping skin when the secondary blank 92 is clamped and rotated, thereby avoiding failure in drawing too many components out of the rolled food or loosening of the rolled food after the components are drawn out.

The turning part 301 is driven by a turning driving device 330. The turning driving device drives the turning part 301 to rotate around the reversing shaft 304, so that the clamping mechanism 30 is in an open state after the turning part 301 is raised, and the clamping mechanism 30 is in a clamping state after the turning part 301 is closed. The turning driving device may be configured to directly drive the reversing shaft 304 to rotate through a motor assembly, or may drive the turning part 301 to rotate through other linear drive mechanisms.

In an embodiment of the present invention, the turning driving device 330 includes a driver 31 and a transmission assembly 325. The driver 31 is connected to the transmission assembly, and the transmission assembly is connected to the turning part 301. The transmission assembly is also connected to the side blocking part 305, and can drive the side blocking part 305 to be linked with the turning part 301. The driver 31 may be a linear driving cylinder, which generates linear power to drive the side blocking part 305 to move linearly and drives the turning part 301 to rotate through the transmission assembly. The driver 31 may also be a driving motor, which generates rotational power to drive the turning part 301 to rotate and drives the side blocking part 305 to move linearly through the transmission assembly.

Figures 15, 16, 17, 18, 19, 20:
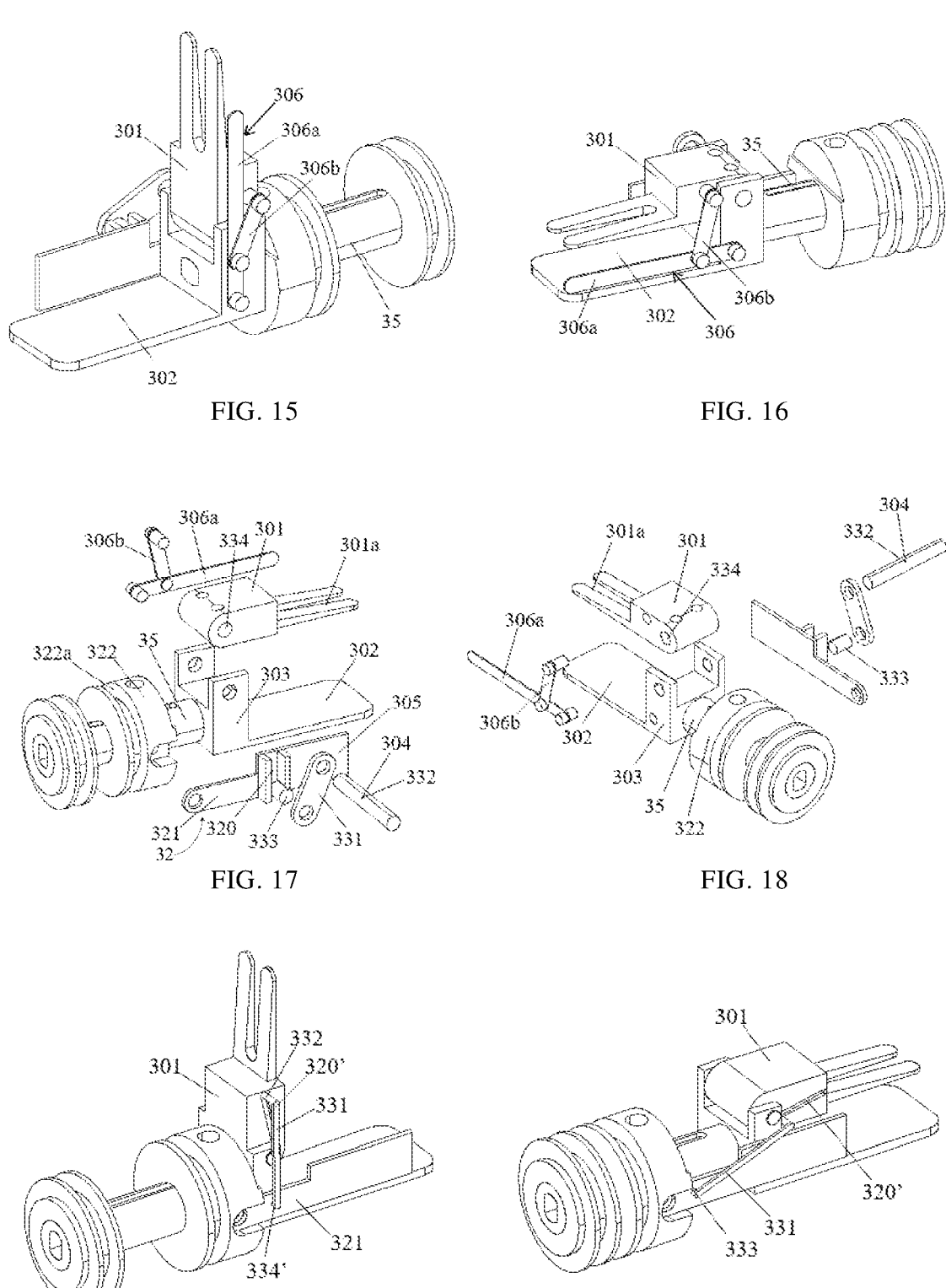
FIG. 15 is another perspective view of FIG. 13.
FIG. 16 is another perspective view of FIG. 14.
FIG. 17 is an exploded schematic diagram of FIG. 13.
FIG. 18 is another perspective view of FIG. 17.
FIG. 19 is a schematic diagram of a state in which the turning part is raised in another embodiment of the clamping mechanism.
FIG. 20 is a schematic diagram of a state in which the turning part in FIG. 19 is pressed down.

In the present embodiment, the driver 31 is a linear driving cylinder 31 (referring to FIGS. 11 and 12), and the transmission assembly 325 includes a linear moving part 32, a connecting plate 331, a first shaft 332 and a second shaft 333 located at two ends of the connecting plate 331, as shown in FIGS. 17 and 18. A shaft hole 334 is provided on the turning part 301, and the first shaft 332 is inserted into the shaft hole 334 and fixed to the turning part 301, so that the first shaft 332 becomes the reversing shaft 304 of the turning part 301 and is mounted on the hinge seat 303. A chute 320 is provided on the linear moving part 32, and the second shaft 333 is inserted into the chute 320. The linear moving part 32 includes a vertical plate 321, and a part of the vertical plate 321 forms the side blocking part 305.

As shown in FIGS. 19 and 20, a chute 320' is provided on the turning part 301, a shaft hole 334' is provided on the vertical plate 321, the first shaft 332 is inserted into the chute 320', and the second shaft 333 is installed in the shaft hole 334'.

Figures 21, 22:
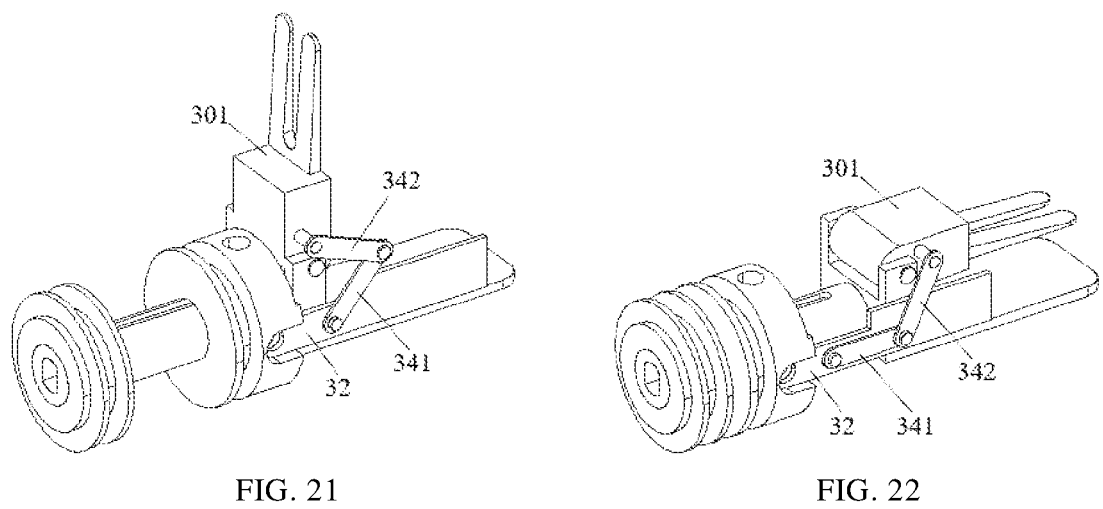
FIG. 21 is a schematic diagram of a state in which the turning part is raised in another embodiment of the clamping mechanism.
FIG. 22 is a schematic diagram of a state in which the turning part in FIG. 21 is pressed down.

In another embodiment, as shown in FIGS. 21 and 22, the transmission assembly 325 includes a linear moving part 32 and a first link mechanism. The first link mechanism 3412 includes a first linkage 341 hinged on the linear moving part 32 and a second linkage 342 hinged on the turning part 301. The first link 341 is hinged with the second link 342.

Figures 23, 24:
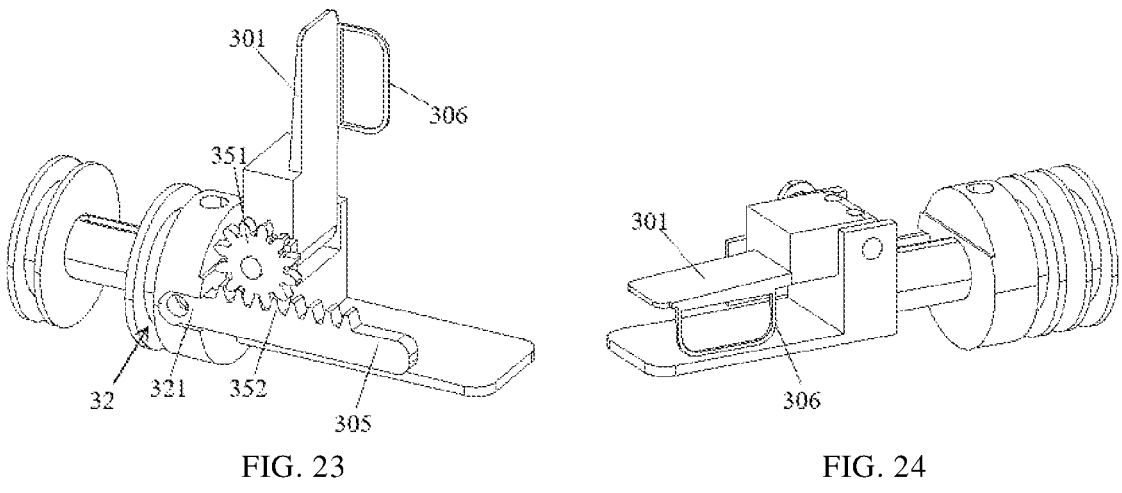
FIG. 23 is a schematic diagram of a state in which the turning part is raised in another embodiment of the clamping mechanism.
FIG. 24 is a schematic diagram of a state in which the turning part in FIG. 23 is pressed down.

As shown in FIGS. 23 and 24, the transmission assembly 325 includes a linear moving part 32 and a rotating wheel. The rotating wheel is fixed to the turning part 301 by the reversing shaft 304. The linear moving part 32 is provided with a linkage part that cooperates with the rotating wheel. The rotating wheel may be a gear 351, and the linkage part is a rack 352 that meshes with the gear 351. Of course, the rotating wheel may also be a friction wheel, and the linkage part is frictionally fit with the friction wheel; or the rotating wheel may be a sheave, and the linkage part is a conveying rope that cooperates with the sheave.

Figure 34:
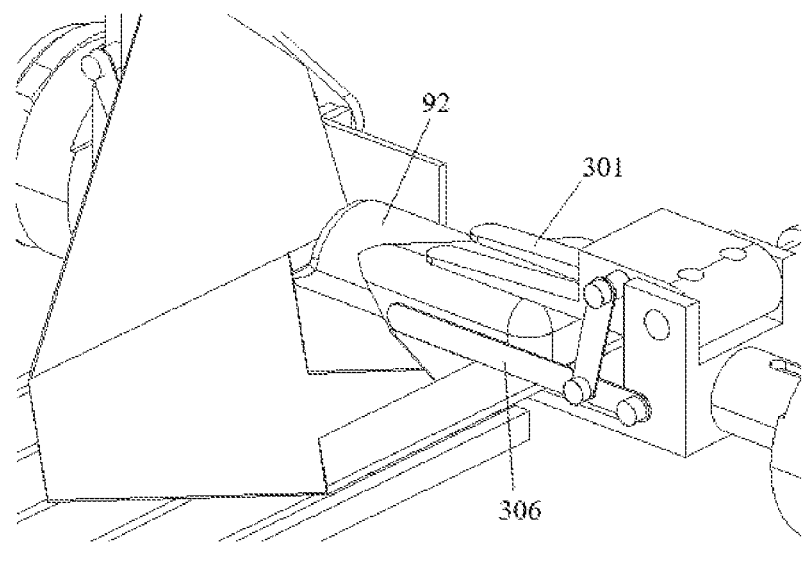
FIG. 34 is a partial enlarged diagram of part A in FIG. 33.

In the clamping mechanism 30, a pressing part 306 that can be lifted up or pressed down is provided on a side of the supporting body 302 opposite to the side blocking part 305, and the pressing part 306 can rotate synchronously with the clamping mechanism 30. When the pressing part 306 is pressed down, there is a gap between a lower edge of the pressing part 306 and the supporting body 302, which is used for accommodating the wrapping skin. The pressing part 306 is used to press the wrapping skin of the secondary blank 92 near the filling portion, as shown in FIG. 34, to prevent the wrapping skin from loosening when the clamping mechanism 30 rotates.

As shown in FIGS. 15-18, the pressing part 306 includes a pressing rod 306$a$, and one end of the pressing rod 306$a$ is hinged with the supporting body 302 and connected to the turning part 301 through a second link mechanism, so that when the turning part 301 is opened relative to the supporting body 302, the pressing rod 306$a$ can be lifted up in a linkage manner, and when the turning part 301 is closed relative to the supporting body 302, the pressing rod 306$a$ can be pressed down in a linkage manner. The second link mechanism includes a hinge rod 306$b$. One end of the hinge rod 306$b$ is hinged to the turning part 301, and the other end is hinged to the pressing rod 306$a$.

As shown in FIG. 24, the pressing part 306 may be a part of the turning part 301. In addition, the pressing part 306 may be in the shape of a rod, a plate, a block, or the like.

As shown in FIGS. 17 and 18, the clamping mechanism 30 further includes a main shaft 35, and the supporting body 302 and the hinge seat 303 are fixed on the end of the main shaft 35. The main shaft 35 is connected with a power output shaft of the rotation driving mechanism 36. The linear moving part 32 includes a sliding sleeve 322 fixed with the vertical plate 321. The sliding sleeve 322 is sleeved on the outer side of the main shaft 35. The main shaft 35 is slidably installed in the sliding sleeve 322 through a key and keyway structure, so that they can slide with respect to each other in the axial direction and can rotate synchronously. The main shaft 35 and the sliding sleeve 322 can also be matched with each other through a spline shaft and a spline hole, or through a special-shaped shaft and a special-shaped shaft hole.

Figure 10:
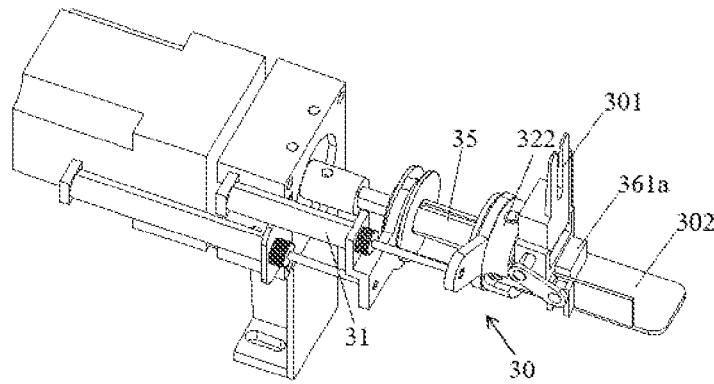
FIG. 10 is a schematic structural diagram of a clamping mechanism.
Figure 11:
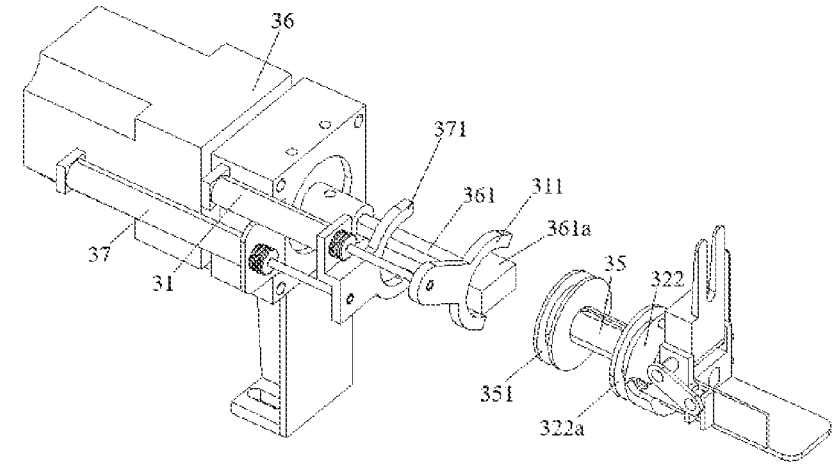
FIG. 11 is an exploded schematic diagram of FIG. 10.
Figure 12:
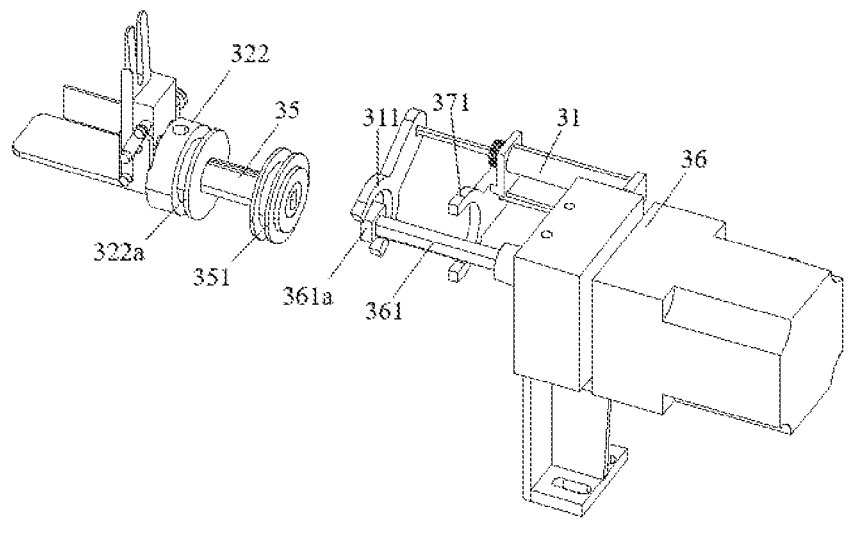
FIG. 12 is another perspective view of FIG. 11.
Figures 13, 14:
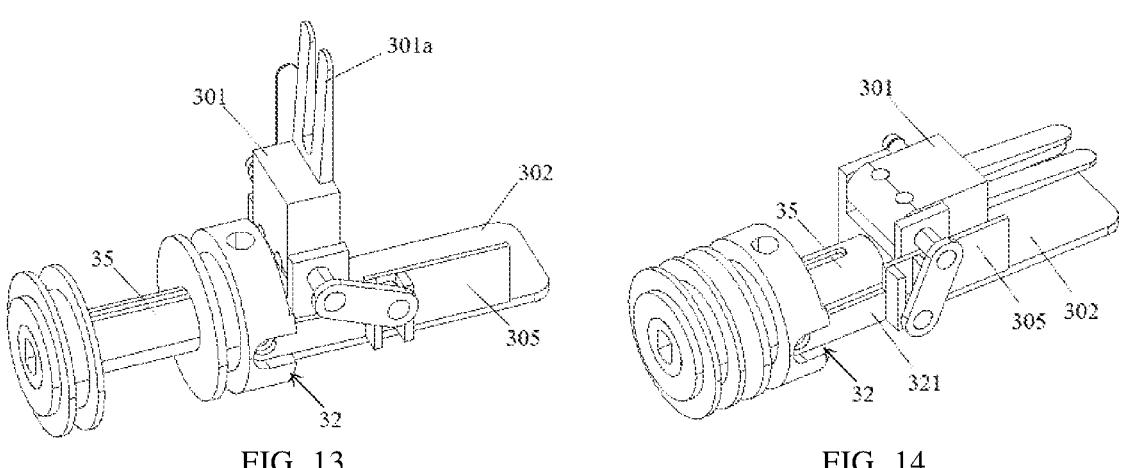
FIG. 13 is a schematic diagram of a state in which a turning part is raised in an embodiment of the clamping mechanism.
FIG. 14 is a schematic diagram of a state in which the turning part is pressed down in an embodiment of the clamping mechanism.

As shown in FIGS. 10-12, the sliding sleeve 322 is provided with a first annular groove 322$a$. The linear driving cylinder 31 is connected with a first shifting block 311 in a fork shape, and the first shifting block 311 is inserted into the first annular groove 322$a$. The first shifting block 311 can be driven to move linearly by the linear driving cylinder 31, thereby driving the sliding sleeve 322 to move on the main shaft 35.

The rotation driving mechanism 36 may be a rotating motor. A power output shaft 361 of the rotating motor 36 is inserted into an end of the main shaft 35 away from the supporting body 302 and installed in sliding fit with the main shaft 35 so as to be able to slide with respect to each other along the axial direction and rotate synchronously.

A second annular groove 351 is provided on the main shaft 35. The drawing driving mechanism 37 may be a pumping cylinder, and the pumping cylinder 37 is connected with a second shifting block 371 in a fork shape which is inserted into the second annular groove 351. The linear driving cylinder 31 is mounted on the second shifting block 371. The pumping cylinder 37 can drive the second shifting block 371 to move linearly, thereby driving the main shaft 35 and the sliding sleeve 322 to move along the power output shaft 361 of the rotating motor 36 together. A stopper 361$a$ is installed on the end of the power output shaft 361 after passing through the main shaft 35 and the hinge seat 303. The stopper 361$a$ is located between the supporting body 302 and the turning part 301. When the main shaft 35 moves backward on the power output shaft 361, the stopper 361$a$ does not move, and functions to block the rolled food 93.

Figure 32:
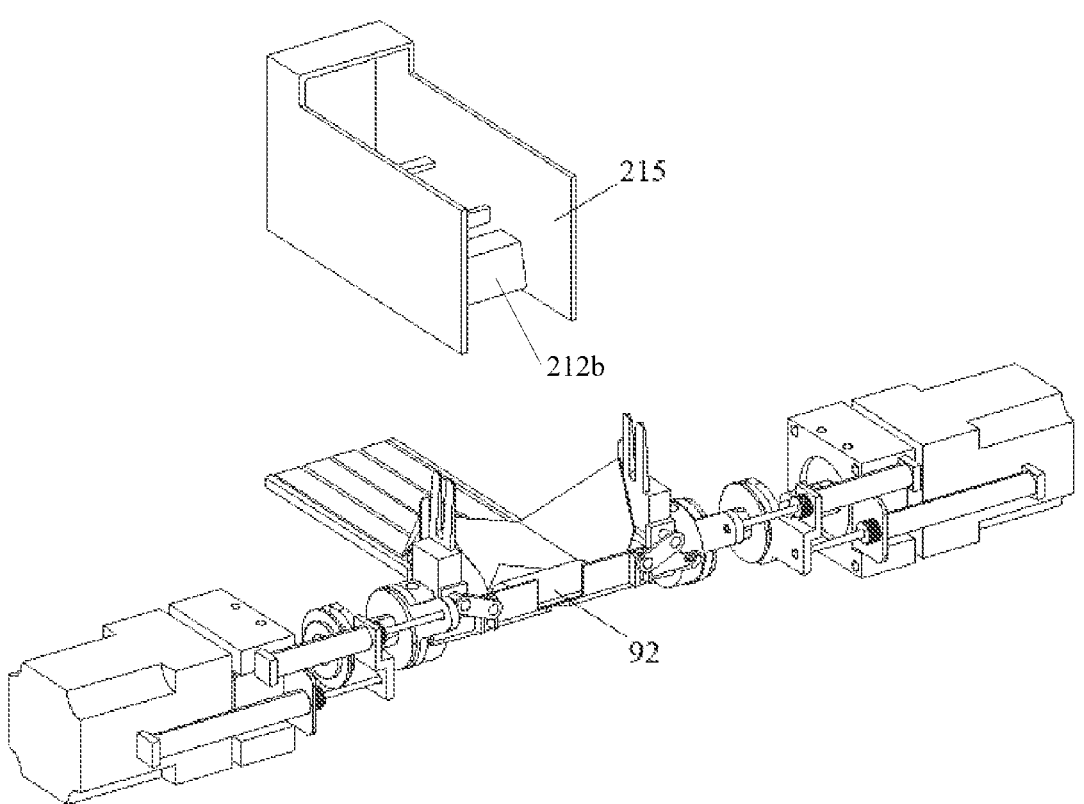
FIG. 32 is a partial schematic diagram of State 7 of the food forming process.
Figure 33:
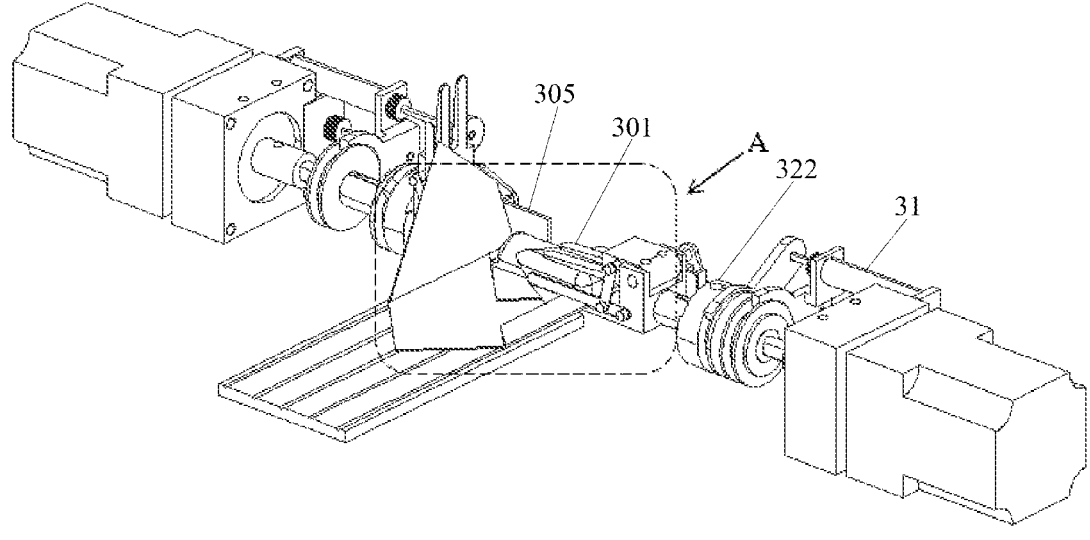
FIG. 33 is a partial schematic diagram of State 8 of the food forming process.
Figure 35:
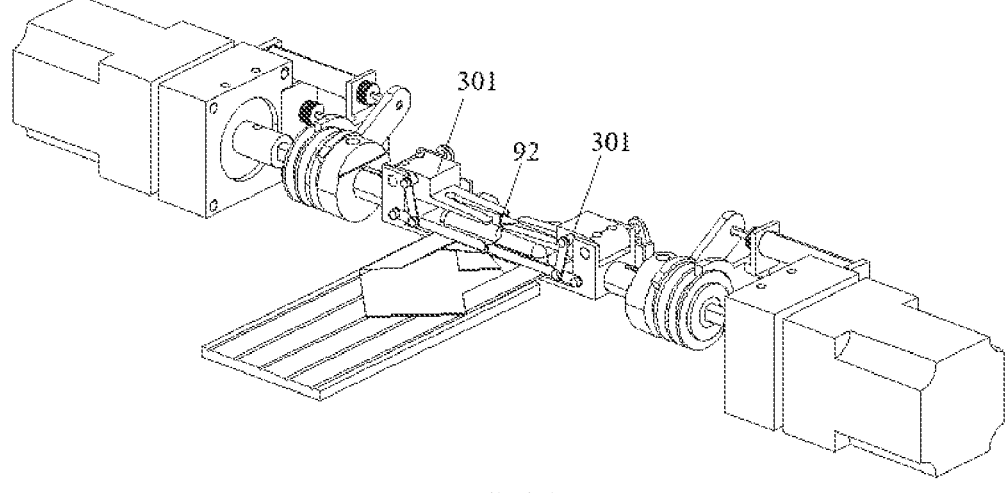
FIG. 35 is a partial schematic diagram of State 9 of the food forming process.

As shown in FIGS. 7, 29 and 32, when the pushing cylinder 212$a$ (referring to FIG. 7) drives the pushing block 212$b$ to push the secondary blank 92 with two sides lifted up onto the supporting body 302, the side plate driving cylinder 216 lifts the movable side plate 215. As shown in FIG. 33, the linear driving cylinder 31 of one of the clamping mechanisms 30 drives the sliding sleeve 322 to move backwards, driving the side blocking part 305 to move backwards while pressing the turning part 301 down. Meanwhile, the pressing part 306 is pressed down at the same time, as shown in FIG. 34. Then another clamping mechanism 30 starts to act, as shown in FIG. 35.

The food forming mechanism further includes an auxiliary pressing part 61 and a pressing part driving device. As shown in FIG. 1, the pressing part driving device can drive the auxiliary pressing part 61 to press on the secondary blank 92 or the rolled food at the forming station 900.

Figure 25:
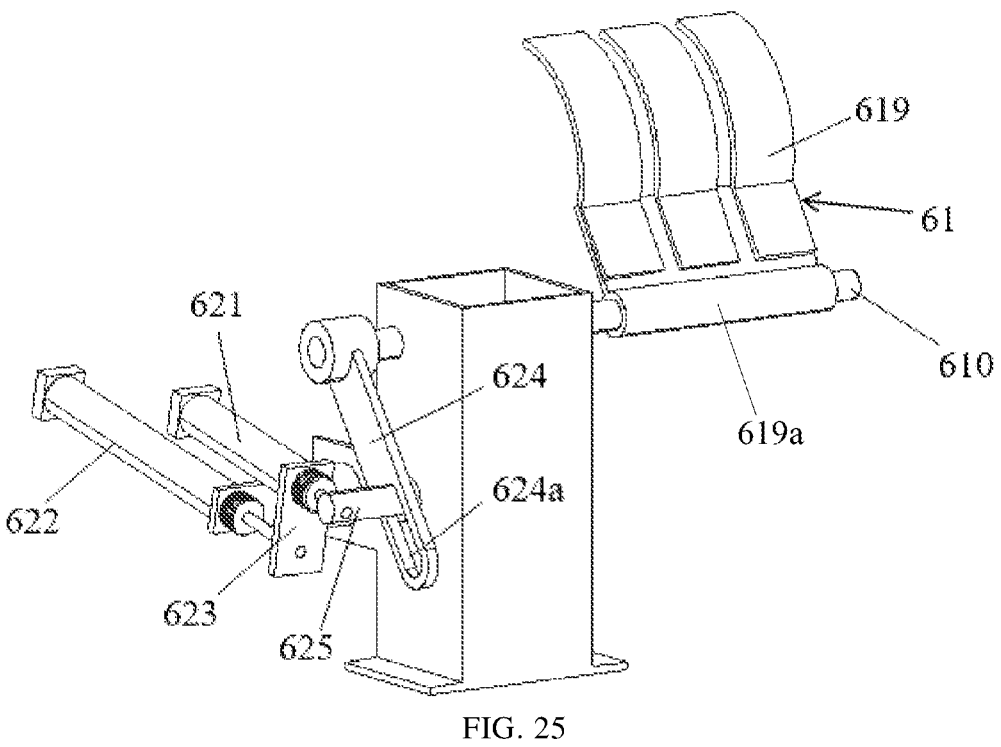
FIG. 25 is a schematic structural diagram of an embodiment of the auxiliary pressing part.
Figure 26:
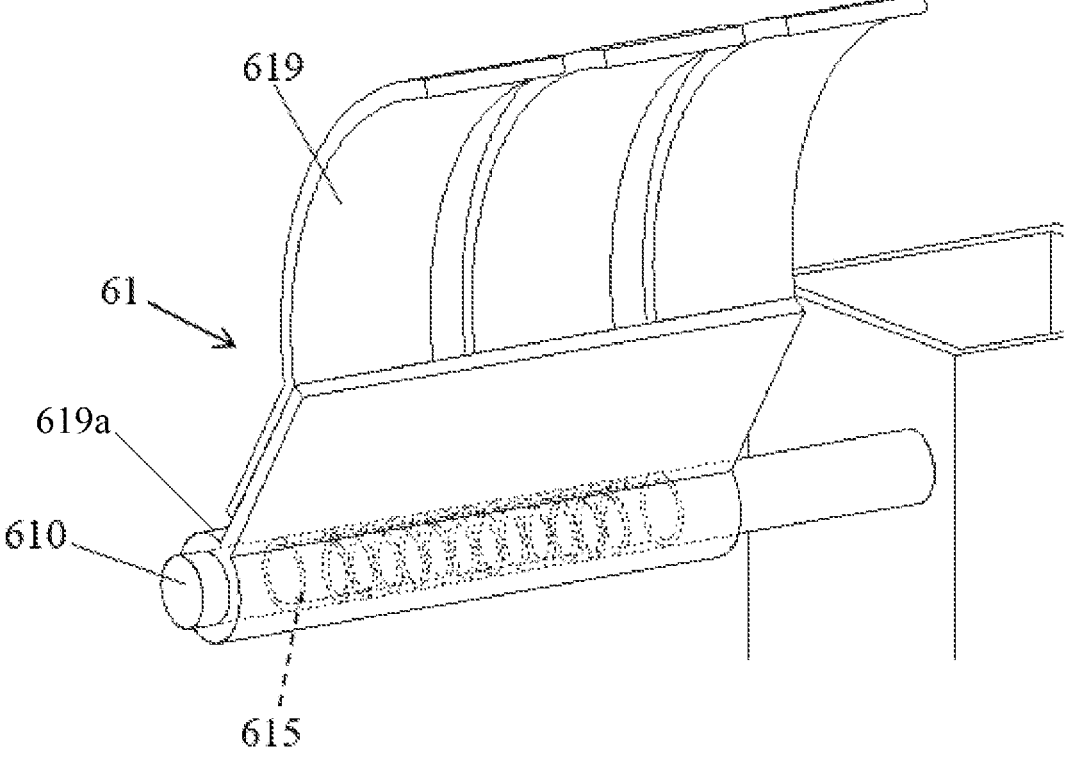
FIG. 26 is a partial schematic diagram of the auxiliary pressing part.

As shown in FIGS. 25 and 26, at least part of the auxiliary pressing part 61 may be an arc-shaped plate 619. The arc-shaped plate 619 is mounted on a mounting shaft 610 through an elastic buffer. The elastic buffer may be a buffer spring 615. The arc-shaped plate 619 is fixed on a sleeve 619$a$, the buffer spring 615 is sleeved on the outside of the mounting shaft 610, one end thereof is fixed to the sleeve 619$a$, and the other end is fixed to the mounting shaft 610. The pressing part driving device is used to drive the auxiliary pressing part 61 to rotate so as to press down the arc-shaped plate 619. Under the action of the buffer spring 615, the arc-shaped plate 619 can be slightly lifted up after being squeezed by the rotating secondary blank, so that its position is not fixed when pressing the secondary blank, but can have a certain movement margin to ensure a smooth winding and forming of rolled food.

The pressing part driving device includes a first-stage cylinder 621 and a second-stage cylinder 622. The first-stage cylinder 621 is mounted on a transmission base 623 and a cylinder arm thereof is connected to the auxiliary pressing part 61 through a transmission mechanism, and a cylinder arm of the second-stage cylinder 622 is connected to the transmission base 623. The transmission mechanism includes a sliding column 625 and a transmission plate 624. One end of the transmission plate 624 is fixed to the mounting shaft 610, a long hole 624$a$ is provided on the transmission plate 624, and the sliding column 625 is inserted into the long hole 624*a*. The transmission mechanism may also be other structures, such as a link mechanism, a cam mechanism, and the like.

The first-stage cylinder 621 can drive the auxiliary pressing part 61 to rotate and press down towards the top of the forming station 900, so that when the clamping mechanism rotates, the wrapping skin can be limited to ensure a tight covering. The second-stage cylinder 622 can further drive the auxiliary pressing part 61 to press down such that the rolled food is sent to the second conveying device 5 below the forming station 900. A motor may also be used to conduct a step-by-step driving other than the driving by the first-stage cylinder 621 and the second-stage cylinder 622.

Figure 44:
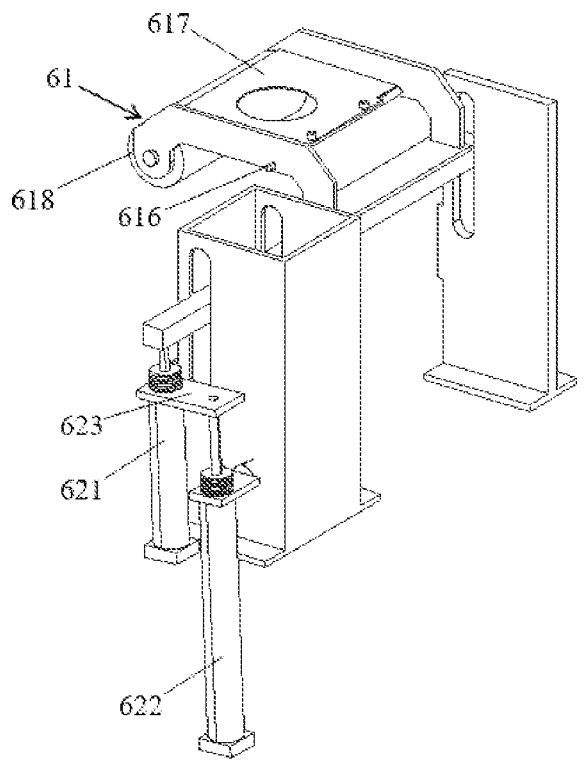
FIG. 44 is a schematic structural diagram of another embodiment of the auxiliary pressing part.
Figure 45:
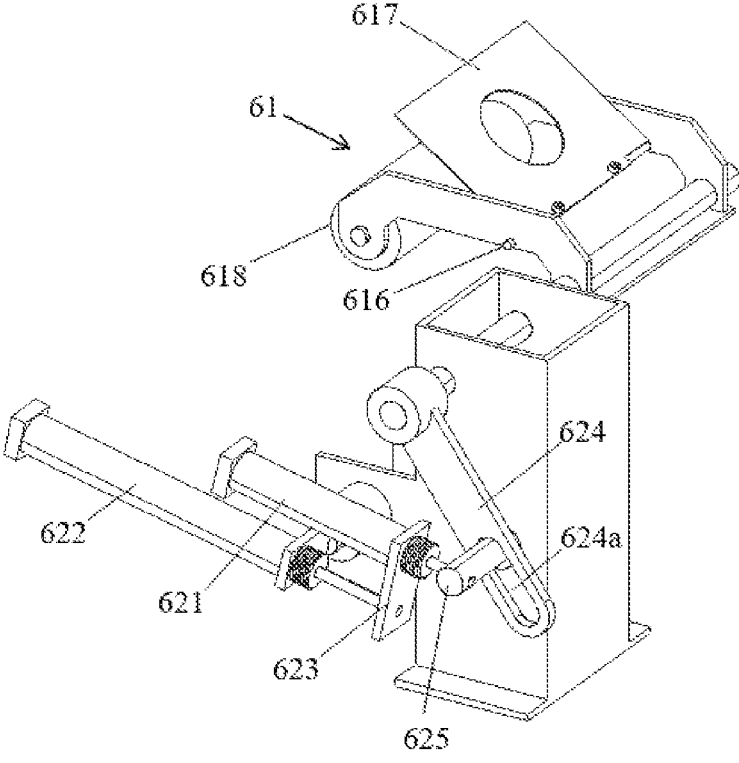
FIG. 45 is a schematic structural diagram of a state in which a scraping portion in the auxiliary pressing part is lifted up.

As shown in FIG. 44, the pressing part driving device may drive the auxiliary pressing part 61 to move up and down as a whole instead of rotating. The auxiliary pressing part 61 includes a pressing roller 618 and a scraping portion 617. The pressing roller 618, when being pressed on the food blank, can rotate with the rotation of the food blank. The scraping portion 617 may be close to the pressing roller 618 to scrape off the food gum on the pressing roller 618. As shown in FIG. 45, the scraping portion 617 is plate-shaped, which is mounted on the scraping portion shaft 616 and can rotate around the scraping portion shaft 616. One side edge of the scraping portion 617 may be placed on the pressing roller 618.

Figures 36, 37:
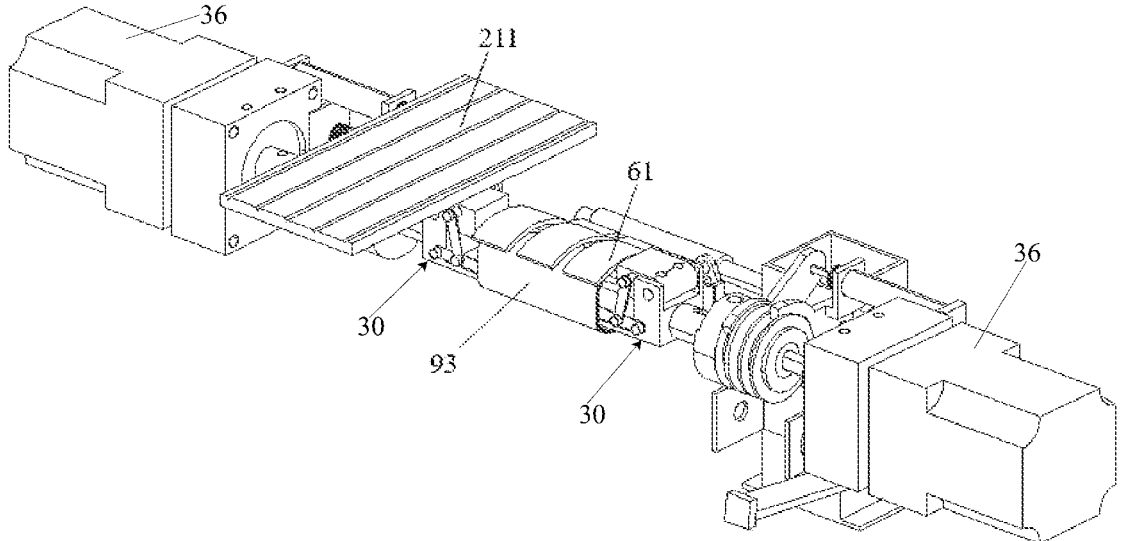
FIG. 36 is a partial schematic diagram of State 10 of the food forming process.
FIG. 37 is another perspective view of FIG. 36.

As shown in FIGS. 36 and 37, the auxiliary pressing part 61 is pressed above the forming station 900, and then the clamping mechanism 30 is driven to rotate by the rotating motor 36, so that the rolled food 93 is rolled and formed. After the rotation is completed, the lifting plate 211 is raised again.

Figure 27:
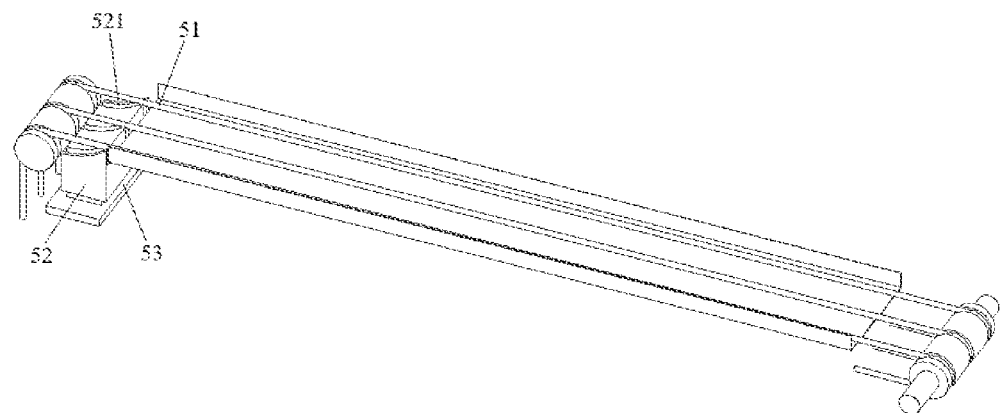
FIG. 27 is a schematic diagram of a second conveying device.
Figure 28:
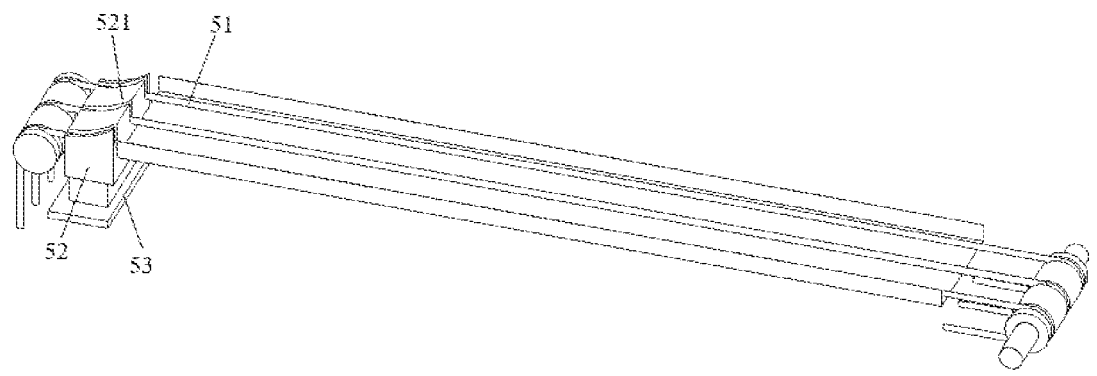
FIG. 28 is a schematic diagram of a state in which a supporting block in FIG. 26 is raised.

The second conveying device 5 is also provided below the forming station 900, as shown in FIG. 1, and the second conveying device 5 includes a plurality of conveying ropes 51 arranged in parallel. Below the forming station 900, a supporting block 52 and a lifting driving device are also provided. The lifting driving device may be a block lifting cylinder 53. The upper end surface of the supporting block 52 is provided with a plurality of give-way slots 521 corresponding to each of the transmission ropes 51 respectively. The block lifting cylinder 53 can drive the supporting block 52 to ascend so that the conveying rope 51 enters the give-way slot 521, as shown in FIG. 28, and drive the supporting block 52 to descend so that the conveying rope 51 is exposed from the give-way slot 521, as shown in FIG. 27. When the clamping mechanism rotates, the supporting block 52 is lifted and supported under the secondary blank to support the secondary blank, so as to ensure that the rolled food can be tightly wound after being formed.

Figure 38:
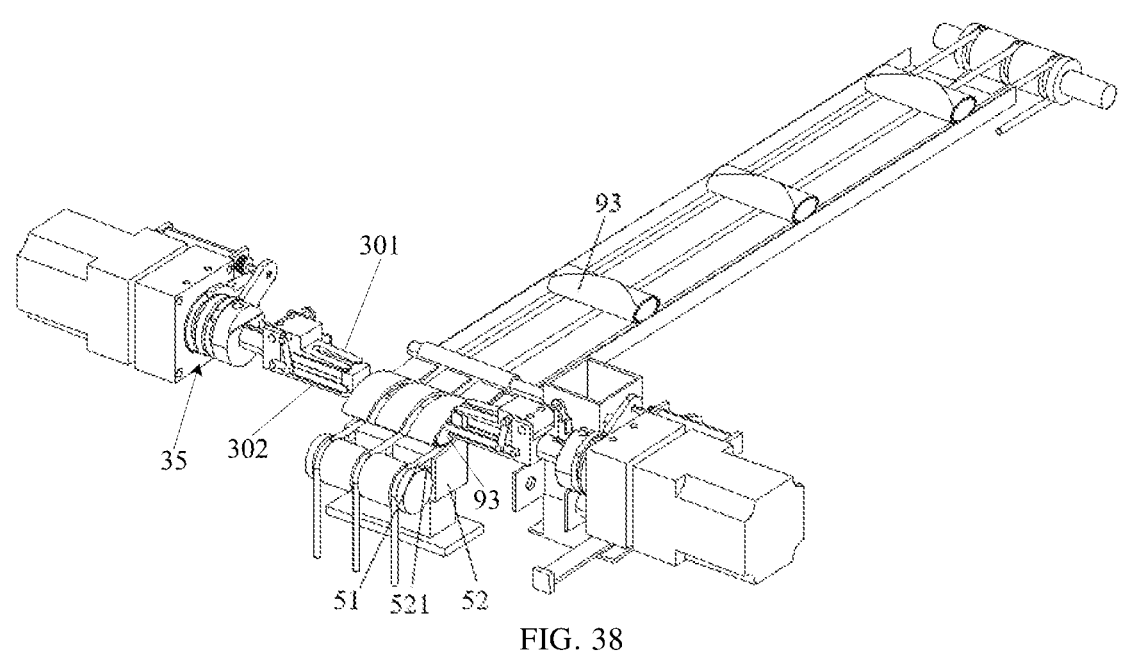
FIG. 38 is a partial schematic diagram of State 11 of the food forming process.

As shown in FIG. 38, after the rotation of the clamping mechanism 30 is completed, the pumping cylinder 37 drives the main shaft 35 to move backward so that the supporting body 302 and the turning part 301 are drawn away from the rolled food 93.

Figure 39:
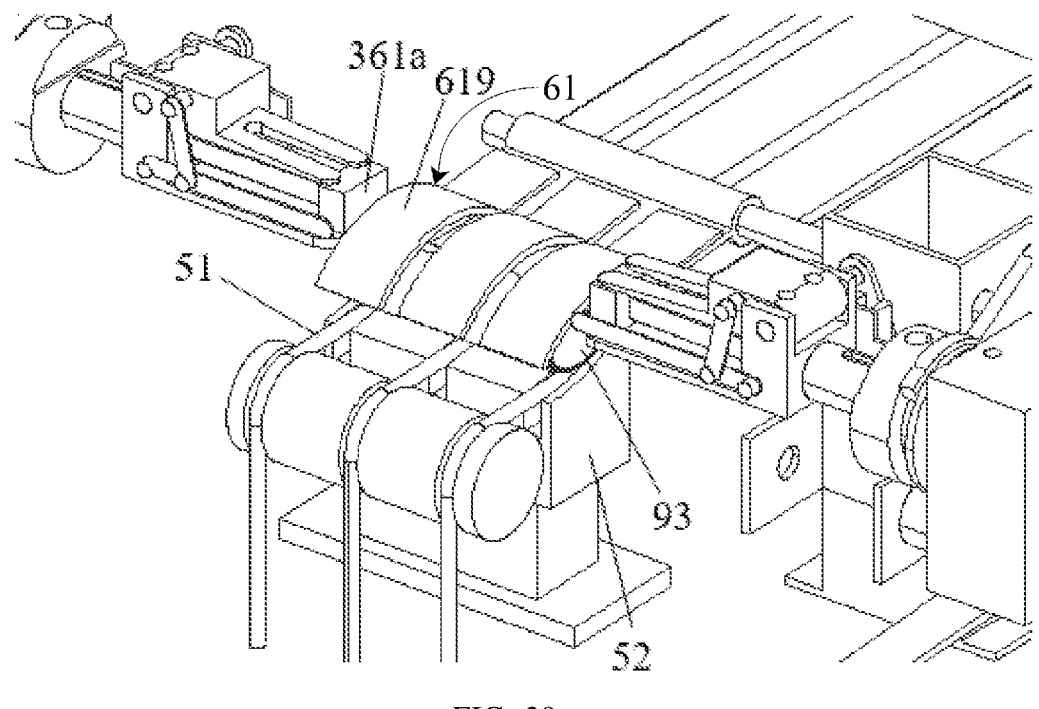
FIG. 39 is another perspective view of FIG. 38.

As shown in FIG. 39, the supporting block 52 is then moved down, and the rolled food 93 is placed on the conveying rope 51. Since the stopper 361*a* is used to block the rolled food 93 after the clamping mechanism is drawn away, it may cause the rolled food 93 unable to fall normally under the action of gravity. Therefore, the auxiliary pressing part 61 continues to rotate and move down to press the rolled food 93 to force it to move down.

Figure 40:
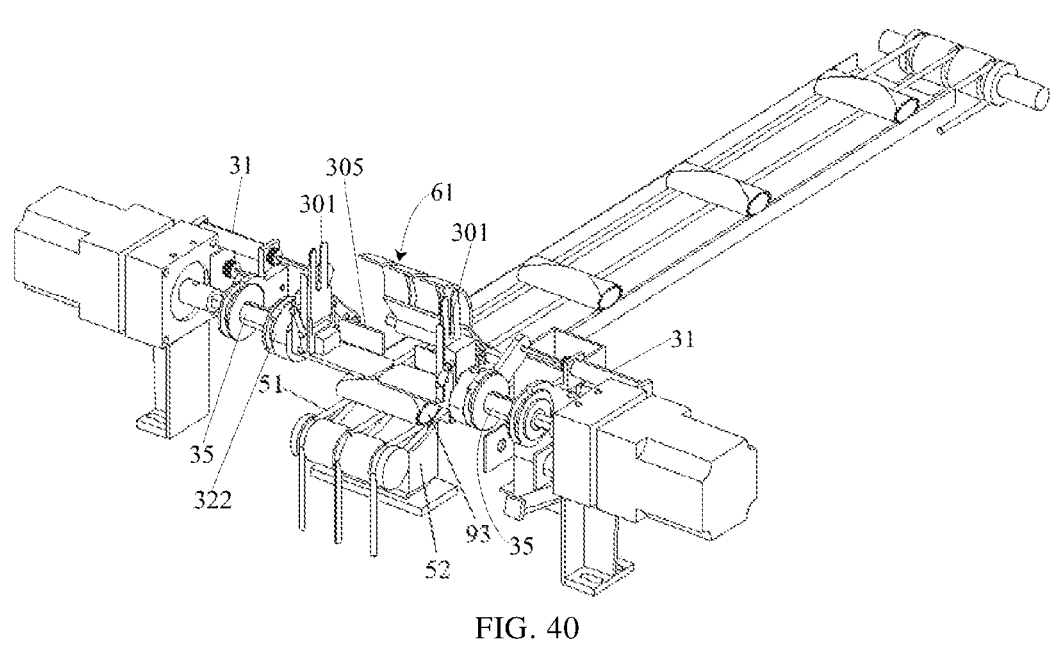
FIG. 40 is a partial schematic diagram of State 12 of the food forming process.

As shown in FIG. 40, the conveying rope 51 sends the rolled food 93 out, and at the same time, an upper cover is lifted and reset to an initial position. The pumping cylinder 37 drives the main shaft 35 to move forward, the linear driving cylinder 31 drives a sliding sleeve 322 to move forward on the main shaft 35, the side blocking part 305 is reset, the turning part 301 is lifted up, and the downward movement cycle process is performed.

It would be understood that the above-mentioned embodiments are only examples for clear illustration, but not limitations. For those skilled in the art, other different forms of changes or modifications can be made on the basis of the above description. There is no need and cannot be exhaustive of all implementations. The obvious changes or modifications derived therefrom still belong to the protection scope of the present invention.

The invention claimed is:

1. A food forming mechanism, comprising:
   a supporting part configured to support a food blank on a forming station;
   two turning parts, which are oppositely arranged and configured to fold two sides of the food blank respectively, wherein at least one of the turning parts cooperates with the supporting part to form a clamping mechanism for clamping the food blank;
   a turning driving device configured to drive the turning part to turn;
   a rotation driving mechanism configured to drive the clamping mechanism to rotate so as to form the food blank into a rolled food; and
   a drawing driving mechanism configured at least to drive the clamping mechanism to move away from the rolled food so that the clamping mechanism is drawn out from the rolled food,
   wherein the supporting part comprises two supporting bodies arranged oppositely, and each supporting body cooperates with one of the turning parts to form one of the clamping mechanisms, and
   the food forming mechanism further comprises a first conveying device for conveying the food blank to the forming station, wherein the first conveying device comprises a conveying belt assembly and a lift-up forming mechanism for lifting up two sides of the food blank, the conveying belt assembly comprises three conveying belts arranged adjacently, a middle part of the food blank is capable of being placed on a second conveying belt located in the middle, and the two sides of the food blank are respectively located on a first conveying belt and a third conveying belt,
   wherein the first conveying belt and the third conveying belt extend to a position beyond the second conveying belt, the lift-up forming mechanism comprises a lifting plate and a pushing device disposed at a gap between the first conveying belt and the third conveying belt, the lifting plate is capable of being ascended to a position where one end of the lifting plate is close to the second conveying belt and descended to a position where the other end of the lifting plate is close to the forming station, and wherein fixed side plates are provided on two sides of the lifting plate at least in a lifting interval range thereof to block the two sides of the food blank and keep them lifted up, and the pushing device is used for pushing the food blank on the lifting plate with the two sides lifted up to the forming station.

2. The food forming mechanism according to claim 1, wherein in the clamping mechanism, a side blocking part is provided on one side of the supporting body, the side blocking part and the supporting body are two separate parts connected together, and the side blocking part is separable from a side of the supporting body when the turning part and the supporting body form the clamping mechanism.

3. The food forming mechanism according to claim 2, wherein the turning driving device comprises a driver and a transmission assembly, the driver being connected to the transmission assembly, and the transmission assembly being connected to the turning part and the side blocking part, so as to drive the side blocking part to be linked with the turning part, and wherein the transmission assembly comprises a linear moving part, a connecting plate, and a first shaft and a second shaft located at both ends of the connecting plate, and wherein one of the linear moving part and the turning part is provided with a chute, and the other is provided with a shaft hole, one of the first shaft and the second shaft being arranged in the shaft hole, and the other being arranged in the chute.

4. The food forming mechanism according to claim 3, wherein the clamping mechanism comprises a main shaft, the supporting body is fixed to an end of the main shaft, and the main shaft is connected with a power output shaft of the rotating drive mechanism, and wherein the main shaft is installed in sliding fit with the linear moving part of the transmission assembly so as to be able to slide with respect to each other in an axial direction and to rotate synchronously.

5. The food forming mechanism according to claim 4, wherein the power output shaft of the rotating drive mechanism is installed in sliding fit with the main shaft so as to be able to slide with respect to each other in the axial direction and rotate synchronously.

6. The food forming mechanism according to claim 5, wherein a stopper is provided at an end of the power output shaft of the rotation driving mechanism, and the stopper is located between the supporting body and the turning part.

7. The food forming mechanism according to claim 4, wherein the linear moving part is sleeved on the outer side of the main shaft, a first annular groove is provided on the linear moving part, the driver is connected with a first shifting block, and the first shifting block is inserted into the first annular groove.

8. The food forming mechanism according to claim 4, wherein a second annular groove is provided on the main shaft, a second shifting block is connected to the drawing driving mechanism, and the second shifting block is inserted into the second annular groove, and wherein the driver is mounted on the second shifting block.

9. The food forming mechanism according to claim 1, wherein in the clamping mechanism, a pressing part that is capable of being lifted up or pressed down is provided on the supporting body, and the pressing part is capable of rotating synchronously with the clamping mechanism.

10. The food forming mechanism according to claim 9, wherein the pressing part comprises a pressing rod, one end of which is hinged with the supporting body and is operatively coupled to the turning part through a second link mechanism, so that when the turning part is opened with respect to the supporting body, the pressing rod is capable of being driven to lift, and when the turning part is closed with respect to the supporting body, the pressing rod is capable of being driven to pressed down.

11. The food forming mechanism according to claim 1, wherein the food forming mechanism further comprises an auxiliary pressing part and a pressing part driving device which drives the auxiliary pressing part to press the auxiliary pressing part on the food blank or rolled food at the forming station.

12. The food forming mechanism according to claim 11, wherein the pressing part driving device drives the auxiliary pressing part to ascend and descend or drives the auxiliary pressing part to rotate around a mounting shaft.

13. The food forming mechanism according to claim 11, wherein a second conveying device is further provided below the forming station so that the pressing part driving device drives the auxiliary pressing part to send the rolled food pressed under the auxiliary pressing part to the second conveying device.

14. The food forming mechanism according to claim 11, wherein the pressing part driving device comprises a first-stage cylinder and a second-stage cylinder, the first-stage cylinder is mounted on a transmission base and a cylinder arm thereof is connected to the auxiliary pressing part through a transmission mechanism, and the cylinder arm of the second-stage cylinder is connected to the transmission base.

15. The food forming mechanism according to claim 1, wherein a second conveying device is further provided below the forming station, the second conveying device comprises a plurality of conveying ropes arranged in parallel, a supporting block and a lifting driving device are provided below the forming station, an upper end face of the supporting block is provided with a give-way slot corresponding to a transmission rope, and the lifting driving device is capable of driving the supporting block to ascend so that the conveying ropes enters the give-way slot and driving the supporting block to descend so that the conveying ropes are exposed from the give-way slot.

16. The food forming mechanism according to claim 1, wherein the lift-up forming mechanism further comprises two movable side plates, and gaps are capable of being formed between the two movable side plates and two fixed side plates respectively, so as to respectively accommodate the two sides of the lifted food blank.

17. The food forming mechanism according to claim 1, wherein an auxiliary pressing roller assembly and a lifting driving device are respectively provided on two sides of the lifting plate and at positions above the first conveying belt and the third conveying belt, and wherein the auxiliary pressing roller assembly comprises at least one pressing roller, and the lifting driving device is used to drive the at least one pressing roller to lift upward.

18. The food forming mechanism according to claim 1, further comprising a flanging mechanism for flanging the wrapping skin of a primary blank to cover a filling so as to form a secondary blank, wherein the primary blank comprises a sheet-shaped wrapping skin and the filling located on the wrapping skin, wherein the flanging mechanism comprises a platen with a drain groove and a reversible part with a recess located under the drain groove, wherein when the primary blank is placed on the platen and the drain groove is positioned vertically below the filling, a part of the wrapping skin holding the filling is capable of leaking down the drain groove and entering the recess together with the filling, and wherein the reversible part is capable of being rotated at least half-circle to roll the wrapping skin and the filling under the reversible part and drop them.

* * * * *